(12) United States Patent
Ives et al.

(10) Patent No.: US 11,884,172 B2
(45) Date of Patent: Jan. 30, 2024

(54) BATTERY CHARGING FOR HYBRID ELECTRIC POWERPLANTS

(71) Applicant: Hamilton Sundstrand Corporation, Charlotte, NC (US)

(72) Inventors: Kyle Stephen Ives, Loves Park, IL (US); Stephen Minshull, Bromsgrove (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 222 days.

(21) Appl. No.: 17/390,026

(22) Filed: Jul. 30, 2021

(65) Prior Publication Data
US 2022/0032799 A1 Feb. 3, 2022

Related U.S. Application Data

(60) Provisional application No. 63/058,873, filed on Jul. 30, 2020.

(51) Int. Cl.
*H02J 7/00* (2006.01)
*B60L 53/24* (2019.01)
(Continued)

(52) U.S. Cl.
CPC .............. *B60L 53/24* (2019.02); *B60L 15/20* (2013.01); *B60L 50/60* (2019.02); *B60L 58/12* (2019.02);
(Continued)

(58) Field of Classification Search
CPC .......... B60L 53/24; B60L 15/20; B60L 50/60; B60L 58/12; B60L 2200/10; B64D 27/24; B64D 31/00; B64D 35/08; B64D 2027/026; H02J 7/00032; H02J 7/0048; H02J 7/1469
(Continued)

(56) References Cited

U.S. PATENT DOCUMENTS 10,017,266 B2 7/2018 Phan et al.
2008/0184906 A1 8/2008 Kejha
(Continued)

FOREIGN PATENT DOCUMENTS

CN 105121188 A 12/2015
EP 2853494 A1 4/2015
(Continued)

OTHER PUBLICATIONS

Extended European search report issued in corresponding EP application No. 21188692.4, dated Jan. 5, 2022.
(Continued)

*Primary Examiner* — Zixuan Zhou
(74) *Attorney, Agent, or Firm* — Locke Lord LLP; Daniel J. Fiorello; Gabrielle L. Gelozin

(57) ABSTRACT

A battery charging system for a hybrid electric powerplant can be configured to determine a maximum available charging power available from windmilling and/or excess thermal engine power available, and to use up to the maximum available charging power and/or the excess thermal engine power available to charge a battery. In certain embodiments, a control module can be configured to determine the maximum available charging power available from windmilling.

18 Claims, 3 Drawing Sheets

(51) Int. Cl.
  *B60L 50/60*   (2019.01)
  *B60L 58/12*   (2019.01)
  *B60L 15/20*   (2006.01)
  *B64D 27/24*   (2006.01)
  *B64D 31/00*   (2006.01)
  *H02J 7/14*    (2006.01)
  *B64D 35/08*   (2006.01)
  *B64D 27/02*   (2006.01)

(52) U.S. Cl.
  CPC ............. *B64D 27/24* (2013.01); *B64D 31/00* (2013.01); *B64D 35/08* (2013.01); *H02J 7/00032* (2020.01); *H02J 7/0048* (2020.01); *H02J 7/1469* (2013.01); *B60L 2200/10* (2013.01); *B64D 2027/026* (2013.01); *Y02T 50/60* (2013.01)

(58) Field of Classification Search
  USPC .................................................. 320/101, 109
  See application file for complete search history.

(56) References Cited

U.S. PATENT DOCUMENTS

2016/0257416 A1   9/2016  Himmelmann et al.
2018/0037127 A1*  2/2018  Dudar ..................... B60L 55/00
2020/0083791 A1   3/2020  Latulipe et al.

FOREIGN PATENT DOCUMENTS

EP    3772462 A1    2/2021
WO    2010067172 A2  6/2010
WO    2019155173 A1  8/2019

OTHER PUBLICATIONS

Communication issued in corresponding EP application No. 21188692.4, dated Jun. 23, 2023.

* cited by examiner

BATTERY CHARGING FOR HYBRID ELECTRIC POWERPLANTS

CROSS-REFERENCE TO RELATED APPLICATIONS

This application claims priority to and the benefit of U.S. Provisional Application No. 63/058,873, filed Jul. 30, 2020, the entire contents of which are herein incorporated by reference in their entirety.

FIELD

This disclosure relates to hybrid electric powerplants, e.g., for aircraft.

BACKGROUND

To improve fuel efficiency of small to mid-size passenger aircraft, parallel hybrid propulsion architectures are being explored. In certain parallel hybrid architectures for electric aircraft propulsion, the battery is recharged through a ground based charger after the aircraft has landed. This is similar to how a traditional non-hybrid aircraft is refueled with jet fuel. However, the charging time for the hybrid architecture is much longer and may take several hours to fully recharge the batteries.

Moreover, parallel hybrid propulsion architectures are most applicable for relatively short flights in the region of 100-200 nautical miles. To be profitable, airlines schedule short turnaround times which do not allow sufficient charging time needed to fully recharge the batteries in the hybrid system.

In addition, current technology battery systems do not have enough energy density to allow for a large amount of electrical reserve energy for use in aircraft emergency situations. In the case of an engine out or other aircraft emergencies, where additional engine power is needed for extended amounts of time, the battery may become depleted and leave only thermal power available.

Such conventional methods and systems have generally been considered satisfactory for their intended purpose. However, there is still a need in the art for improved hybrid electric recharging systems and methods. The present disclosure provides a solution for this need.

SUMMARY

A battery charging system for a hybrid electric powerplant can be configured to determine a maximum available charging power available from windmilling and/or excess thermal engine power available, and to use up to the maximum available charging power and/or the excess thermal engine power available to charge a battery. In certain embodiments, a control module can be configured to determine the maximum available charging power available from windmilling.

In certain embodiments, the control module can include a windmilling power available module configured to receive aircraft data and to determine the maximum available charging power available from windmilling. In certain embodiments, the control module includes an excess thermal engine power module configured to determine the excess thermal engine power available. In certain embodiments, the excess thermal engine power available can be the excess power available at a current throttle setting measured from engine power output.

The control module can include a sum block operatively configured to receive the maximum available charging power from windmilling and the excess thermal engine power available, and to output a total charging power available. The control module can be an engine controller configured to control the thermal engine to produce a desired power output.

The system can include a power converter configured to supply power from a battery to an electric motor, and to receive power from the electric motor to charge the battery. The power converter can be operatively connected to the control module to receive the total charging power available.

The power converter can include a saturation limit module configured to receive a regeneration power demand (e.g., from a battery management system) and the total charging power available and to output a charging power command up to the lesser of the regeneration power demand and the total charging power available. The power converter can include a division module configured to receive the charging power command and a motor speed to convert the charging power command to a motor torque command.

The power converter can include a motor current controller configured to receive the motor torque command and to control the electric motor to generate electrical power as a function of the motor torque command. In certain embodiments, the power converter and the control module can be connected via a data link. Any other suitable module(s) or location(s) thereof are contemplated herein.

In accordance with at least one aspect of this disclosure, for example, a control system for charging a hybrid electric vehicle battery can include a windmilling power available module configured to receive aircraft data and to determine a maximum available charging power available from windmilling, an excess thermal engine power module configured to determine the excess thermal engine power available, and a sum block operatively configured to receive the maximum available charging power from windmilling and the excess thermal engine power available, and to output a total charging power available.

The control system can include a saturation limit module configured to receive a regeneration power demand and the total charging power available and to output a charging power command up to the lesser of the regeneration power demand and the total charging power available. The control system can include a division module configured to receive the charging power command and a motor speed to convert the charging power command to a motor torque command. The control module can include a motor current controller configured to receive the motor torque command and to control the electric motor to generate electrical power as a function of the motor torque command. Any other suitable module(s) and/or location(s) thereof are contemplated herein.

In accordance with at least one aspect of this disclosure, a computer implemented method can include determining a maximum available charging power available from windmilling, determining a total charging power available using the maximum available charging power and an excess thermal engine power available, and controlling an electric motor to generate electrical power as a function of the total charging power available. Controlling can include controlling the electric motor to produce the lesser of the total charging power available or a regeneration power demand.

The method can include determining the regeneration power demand based at least on a state of charge of the battery. The method can include determining the maximum available charging power available from windmilling using aircraft flight data. Any other suitable method(s) and/or portion(s) thereof are contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
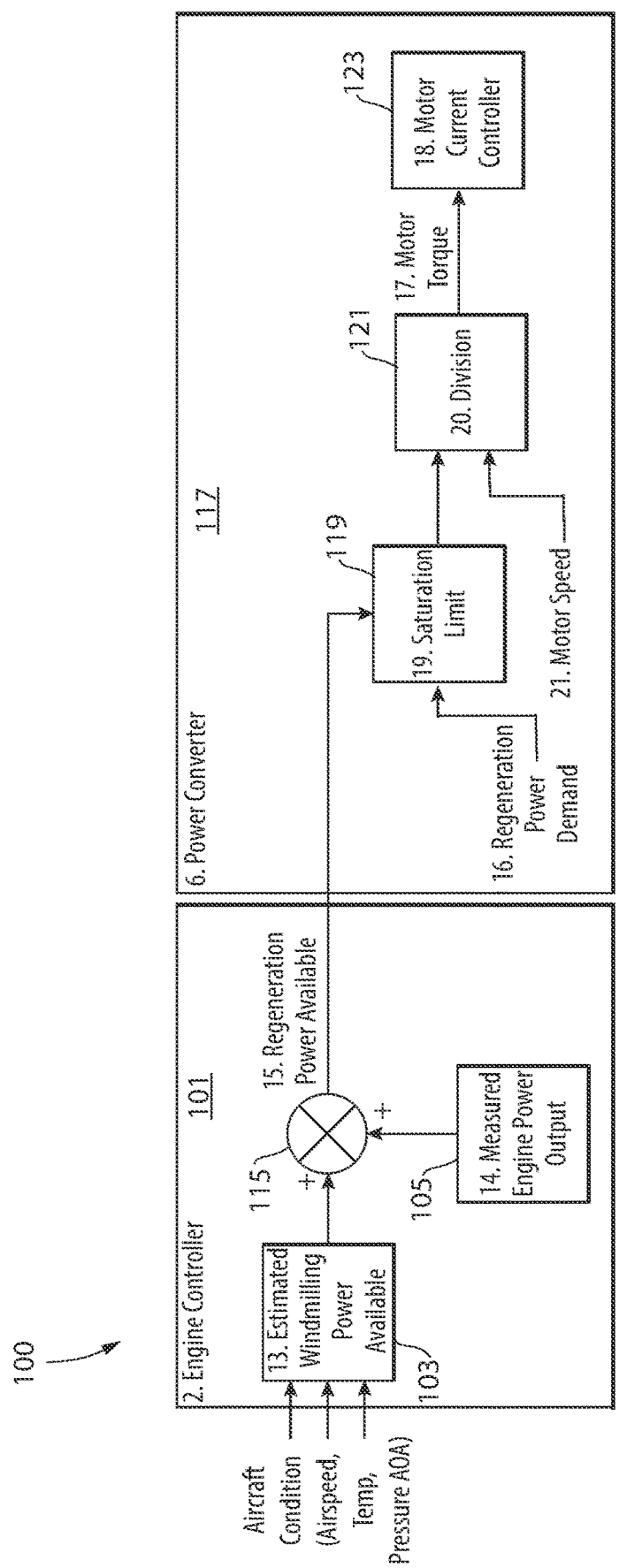
FIG. 1 is a schematic diagram of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2 and 3.

Figure 2:
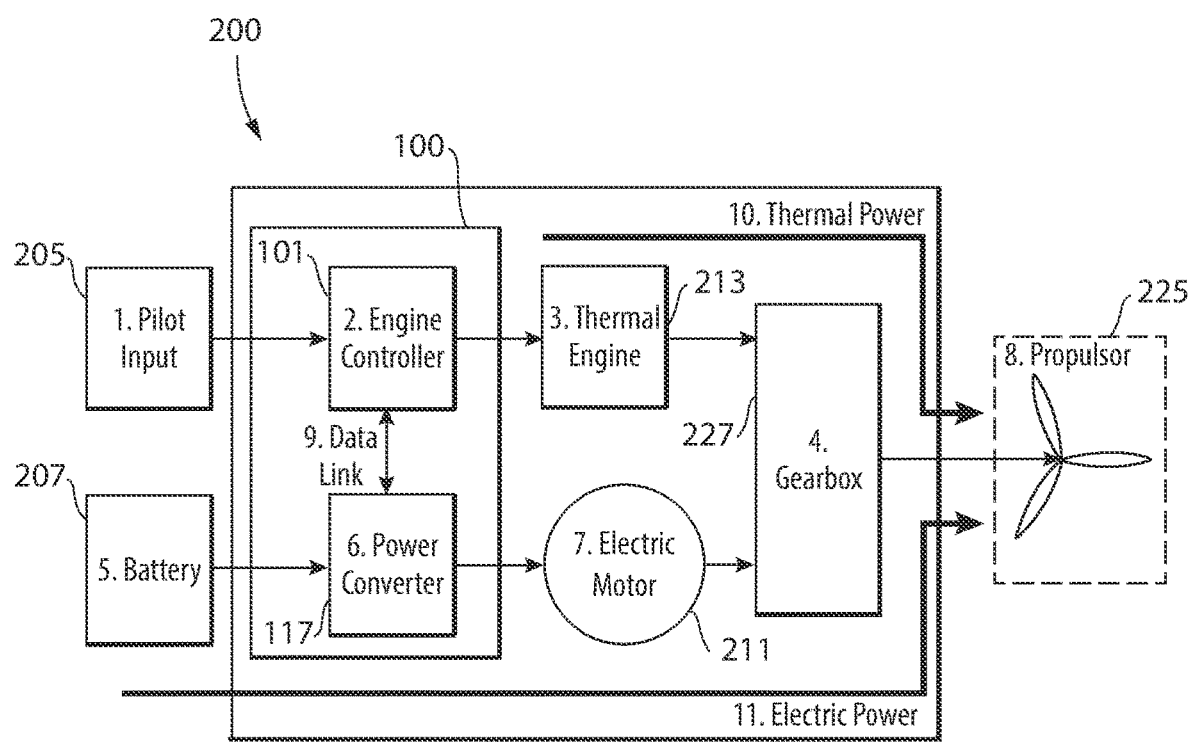
FIG. 2 is schematic diagram of an embodiment of a system in accordance with this disclosure, shown applied to an embodiment of a parallel hybrid electric powerplant architecture, and showing an embodiment of power output from both lanes.
Figure 3:
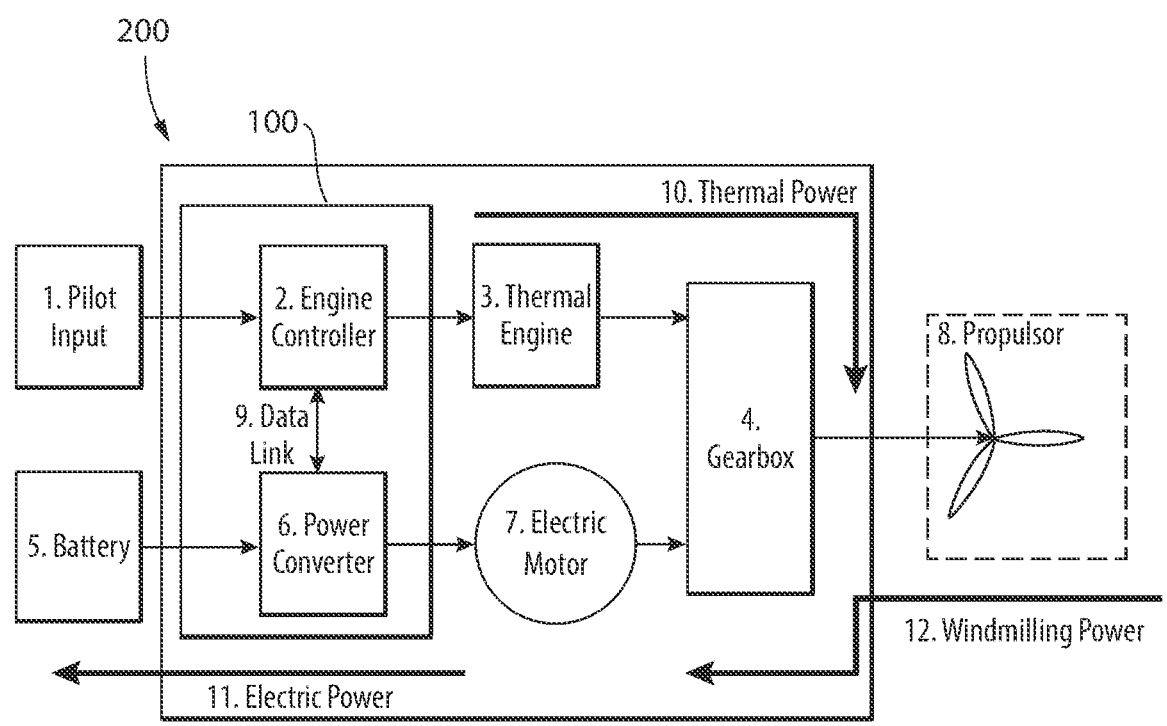
FIG. 3 is a schematic diagram of the embodiment of FIG. 2, shown generating electrical power.

Referring to FIG. 1, a system 100, e.g., a battery charging system for a hybrid electric powerplant (e.g., powerplant 200 as shown in FIGS. 2 and 3), can be configured to determine a maximum available charging power available from windmilling and/or excess thermal engine power available. The system 100 can be configured to use up to the maximum available charging power and/or the excess thermal engine power available to charge a battery (e.g, battery 207 as shown in FIGS. 2 and 3). In certain embodiments, a control module 101 can be configured to determine the maximum available charging power available from windmilling.

In certain embodiments, the control module 101 can include a windmilling power available module 103 configured to receive aircraft data (e.g., airspeed, air temperature, altitude, static pressure, angle of attack, and/or any other suitable data) and to determine the maximum available charging power available from windmilling. In certain embodiments, the control module 101 includes an excess thermal engine power module 105 configured to determine the excess thermal engine power available. In certain embodiments, control module 101 can receive the excess thermal engine power available from any other suitable external source.

In certain embodiments, the excess thermal engine power available can be the excess power available at a current throttle setting measured from engine power output. For example, if a throttle setting input by a pilot (using one or more inputs 205) produces more power than necessary for the desired flight phase (e.g., level flight cruise) the excess thermal engine power available of a thermal engine 213 that can be used to drive the electric motor 211 to recharge the battery 207. In certain embodiments, the system 100 and/or control module 101 can be configured to automatically increase the power output of the thermal engine 213 to produce additional excess power when the thermal engine 213 is capable of producing additional power (e.g., limited by any suitable variables, e.g., such as performance limitations, fuel limitations, range necessary for completion of the mission, etc.).

In certain embodiments, the control module 101 can include a sum block 115 (e.g., connected to modules 103 and 105) operatively configured to receive the maximum available charging power from windmilling and the excess thermal engine power available, and to output a total charging power available. The control module 101 can be an engine controller, e.g., as shown, which can be configured to control the thermal engine 213 to produce a desired power output. The control module 101 and/or any suitable portion thereof can be integrated with or separate from the engine controller.

The system 100 can include a power converter 117 configured to supply power from a battery 207 to an electric motor 211, and to receive power from the electric motor 211 to charge the battery 207. The power converter 117 can be operatively connected to the control module 101 to receive the total charging power available.

For example, the power converter 117 can include a saturation limit module 119 configured to receive a regeneration power demand (e.g., from a battery management system) and the total charging power available (e.g., from the sum block 115) and to output a charging power command up to the lesser of the regeneration power demand and the total charging power available. The regeneration power demand can be determined as a function of state of charge of the battery, and/or as a function of any other suitable battery state, for example. In certain embodiments, the system 100 can include a regeneration power demand module configured to determine the regeneration power demand.

In certain embodiments, the power converter 117 can include a division module 121 configured to receive the charging power command (e.g., from the saturation limit module 119) and a motor speed (e.g., from a speed sensor or other suitable module) to convert the charging power command to a motor torque command. It is contemplated that the system 100 need not convert the power command to a torque command. It is also contemplated that all calculations referring to power herein can be done as torque. As disclosed herein, "power" can include power, torque, or energy, or any other suitable unit related to power for example.

In certain embodiments, the power converter 117 can include a motor current controller 123 configured to receive the motor torque command (e.g., or charging power command directly) and to control the electric motor 211 to generate electrical power as a function of the motor torque command (e.g., to produce the torque value of the command drawing energy from the powerplant). In certain embodiments, the power converter 117 and the control module 101 can be connected via a data link (e.g., a wired connection, a wireless connection).

Embodiments can include any suitable module(s), controllers, converters, and/or electrical components, for example, e.g., as disclosed above. Any other suitable module(s) or location(s) thereof are contemplated herein.

Referring to FIGS. 2 and 3, an embodiment of a parallel hybrid electric powerplant architecture is shown. FIG. 2 shows an embodiment of a powering mode where power is output from both lanes through a gear box 227. FIG. 3 shows an embodiment of a generating mode, where the powerplant is generating electrical power using energy from both lanes through the gear box 227.

In accordance with at least one aspect of this disclosure, for example, a system 100, e.g., a control system for charging a hybrid electric vehicle battery, can include a windmilling power available module 103, e.g., as disclosed above, configured to receive aircraft data and to determine a maximum available charging power available from windmilling. The system 100 can include an excess thermal engine power module 105, e.g., as disclosed above, configured to determine the excess thermal engine power available. The system 100 can include a sum block 115, e.g., as disclosed above operatively configured to receive the maximum available charging power from windmilling and the excess thermal engine power available, and to output a total charging power available.

The control system 100 can include a saturation limit module 119, e.g., as disclosed above, configured to receive a regeneration power demand and the total charging power available and to output a charging power command up to the lesser of the regeneration power demand and the total charging power available. In certain embodiments, the control system 100 can include a division module 121, e.g., as disclosed above configured to receive the charging power command and a motor speed to convert the charging power command to a motor torque command. The control module 100 can include a motor current controller 123, e.g., as disclosed above, configured to receive the motor torque command and to control the electric motor to generate electrical power as a function of the motor torque command.

In certain embodiments, the control module 100 may be a single module containing all disclosed functions of any suitable embodiment or combinations thereof disclosed above. For example, the control module 100 can be a single unit that exists entirely in the power converter 117, entirely in the engine controller 101, or any other suitable location(s) having any suitable split hosting. Any other suitable module(s) and/or location(s) thereof are contemplated herein.

In accordance with at least one aspect of this disclosure, a computer implemented method can include determining a maximum available charging power available from windmilling, determining a total charging power available using the maximum available charging power and an excess thermal engine power available, and controlling an electric motor to generate electrical power as a function of the total charging power available. Controlling can include controlling the electric motor to produce the lesser of the total charging power available or a regeneration power demand.

The method can include determining the regeneration power demand based at least on a state of charge of the battery. The method can include determining the maximum available charging power available from windmilling using aircraft flight data. Any other suitable method(s) and/or portion(s) thereof are contemplated herein.

Any module(s) disclosed herein, e.g., described above, can include any suitable hardware and/or software module(s) configured to perform the disclosed function. Any suitable module(s) may be hosted on common hardware and/or on common software module(s), or be separate in any suitable manner as disclosed herein. Any suitable delineation of module(s) is contemplated herein.

In certain embodiments, a thermal engine controller can determine what maximum power draw is and can tell the power converter in the electric power lane. The power converter can then limit the power draw to this maximum available power, for example. The engine controller can already include the necessary inputs for estimating windmill power available. A battery management system (BMS) or any other suitable system can determine a regeneration power demand, which can be the maximum amount of power the battery can receive safely due to the state of the battery. The total available power can be compared to the regeneration demand, and the lesser value can control, for example. The motor control module can convert the input torque or power, which is proportional to current, to a current generated by the motor, and thus control the motor to the correct current draw.

In parallel hybrid architectures, the main propulsor, e.g., a propeller 225 can be driven by at least two means, e.g., a traditional thermal combustion engine 213 and an electric motor 211, for example. The mechanical outputs of the thermal combustion engine 213 and electric motor 211 can be combined through a gearbox 227 to drive the propulsor 225 (e.g., a propeller, a fan). Typically, the thermal engine 213 can be controlled with an engine controller 101 which can receive commands from the pilot (e.g., via one or more inputs 205) and can produce the necessary actuation signals to drive the thermal engine 213. The electric motor 211 can be controlled with a power converter 117 which can convert electrical power from a battery 207 into a form that can drive the electric motor 211. Typically, this conversion can be DC (from the battery 207) to multi-phase AC (to drive the electric motor 211).

The division of power flow between the thermal engine 213 and electric motor 211 can be selected through the system design and can be adjusted during operation. The electric lane can be sized with sufficient energy storage to provide a power boost to the thermal engine during take-off and climb flight phases with the thermal engine 213 then providing the full power output during cruise, for example. This can provide a fuel saving since the thermal engine 213 can be optimized for optimal efficiency during the cruise phase and does not need to be oversized for the full take off power.

Embodiments can provide a method of reducing the turnaround time of these hybrid electric architectures by employing an energy recovery scheme to charge the batteries during flight modes where power is available from the propeller through windmilling and/or excess power is available from the thermal engine. In embodiments, power can be diverted so that the direction of the electric power flow is reversed to charge the batteries (e.g., as shown in FIG. 3).

Certain embodiments can utilize a communications data link to provide coordination between the engine controller (e.g., a FADEC or other suitable aircraft controller) and the electric motor power lane such that when the engine controller identifies operating conditions where spare power is available from the airstream, it can signal to the power converter to start to extract power and deliver this to the batteries for charging. For example, in the engine controller, an estimate of the power available from windmilling can be calculated by monitoring aircraft operating parameters, including but not limited to airspeed, air temperature, air pressure, and Angle of Attack (AOA), for example. The engine controller can also determine any available engine power output, e.g., by subtracting the minimum power output setting for the engine from the measured power output. The measured power output can be determined through engine torque and speed measurements, for example. The resultant regeneration power available can be passed over the data link to the power converter. The power converter can utilize this data to limit the regeneration power.

A regeneration power demand can be calculated based on the state of the battery system to determine the amount of power needed to properly charge the battery system. The corresponding motor torque needed to achieve the desired power can then calculated by dividing by the measured motor speed. The commanded motor torque can then be scaled to produce a motor current demand before being passed on to a closed loop motor current controller, which can control the power converter switching devices to control the motor current, for example.

Certain embodiments can enable the use of excess power available during descent phase from the airflow for diverting to the batteries, provide closed loop coordination between thermal engine and power converter to adjust the charging power to meet available power and battery system needs, reduce of the on-ground charge time to increase airline profitability, provide additional electrical energy for use in aircraft emergency situations, and reduce the overall system energy consumption by recovering energy that would be otherwise lost.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A battery charging system for a hybrid electric powerplant configured to determine a maximum available charging power available from windmilling and/or excess thermal engine power available, and to use up to the maximum available charging power and/or the excess thermal engine power available to charge a battery;
a control module configured to determine the maximum available charging power available from windmilling, wherein the control module includes a windmilling power available module configured to receive aircraft data and to determine the maximum available charging power available from windmilling.

2. The system of claim 1, wherein the control module includes an excess thermal engine power module configured to determine the excess thermal engine power available.

3. The system of claim 1, wherein the excess thermal engine power available is the excess power available at a current throttle setting measured from engine power output.

4. The system of claim 1, wherein the control module includes a sum block operatively configured to receive the maximum available charging power from windmilling and the excess thermal engine power available, and to output a total charging power available.

5. The system of claim 4, wherein the control module is an engine controller configured to control the thermal engine to produce a desired power output.

6. The system of claim 5, further comprising a power converter configured to supply power from a battery to an electric motor, and to receive power from the electric motor to charge the battery, wherein the power converter is operatively connected to the control module to receive the total charging power available.

7. The system of claim 6, wherein the power converter includes a saturation limit module configured to receive a regeneration power demand and the total charging power available and to output a charging power command up to the lesser of the regeneration power demand and the total charging power available.

8. The system of claim 7, wherein the power converter includes a division module configured to receive the charging power command and a motor speed to convert the charging power command to a motor torque command.

9. The system of claim 8, wherein the power converter includes a motor current controller configured to receive the motor torque command and to control the electric motor to generate electrical power as a function of the motor torque command.

10. The system of claim 6, wherein the power converter and the control module are connected via a data link.

11. A control system for charging a hybrid electric vehicle battery, comprising:
a windmilling power available module configured to receive aircraft data and to determine a maximum available charging power available from windmilling;
an excess thermal engine power module configured to determine the excess thermal engine power available, and
a sum block operatively configured to receive the maximum available charging power from windmilling and the excess thermal engine power available, and to output a total charging power available.

12. The system of claim 11, further comprising a saturation limit module configured to receive a regeneration power demand and the total charging power available and to output a charging power command up to the lesser of the regeneration power demand and the total charging power.

13. The system of claim 12, further comprising a division module configured to receive the charging power command and a motor speed to convert the charging power command to a motor torque command.

14. The system of claim 13, further comprising a motor current controller configured to receive the motor torque command and to control the electric motor to generate electrical power as a function of the motor torque command.

15. A computer implemented method, comprising:
determining a maximum available charging power available from windmilling;
determining a total charging power available using the maximum available charging power and an excess thermal engine power available; and
controlling an electric motor to generate electrical power as a function of the total charging power available.

16. The method of claim 15, wherein controlling includes controlling the electric motor to produce the lesser of the total charging power available or a regeneration power demand.

17. The method of claim 16, further comprising determining the regeneration power demand based at least on a state of charge of the battery.

18. The method of claim 17, further comprising determining the maximum available charging power available from windmilling using aircraft flight data.

* * * * *